United States Patent
Jo et al.

(10) Patent No.: US 11,909,499 B2
(45) Date of Patent: *Feb. 20, 2024

(54) TRANSMITTING AND RECEIVING ANTENNA SYSTEM OF LPWAN REPEATER AND CONTROL METHOD THEREOF

(71) Applicant: AMOTECH CO., LTD., Incheon (KR)

(72) Inventors: Yonggil Jo, Goyang-si (KR); Hyungil Baek, Yongin-si (KR); Jaeil Park, Hwaseong-si (KR); Kyunghyun Ryu, Seoul (KR)

(73) Assignee: AMOTECH CO., LTD., Incheon (KR)

( * ) Notice: Subject to any disclaimer, the term of this patent is extended or adjusted under 35 U.S.C. 154(b) by 329 days.

This patent is subject to a terminal disclaimer.

(21) Appl. No.: 17/416,466

(22) PCT Filed: Dec. 2, 2019

(86) PCT No.: PCT/KR2019/016821
§ 371 (c)(1),
(2) Date: Jun. 18, 2021

(87) PCT Pub. No.: WO2020/130413
PCT Pub. Date: Jun. 25, 2020

(65) Prior Publication Data
US 2022/0069891 A1    Mar. 3, 2022

(30) Foreign Application Priority Data
Dec. 18, 2018    (KR) .......... 10-2018-0163750

(51) Int. Cl.
*H04B 7/15*    (2006.01)
*H01Q 3/02*    (2006.01)
(Continued)

(52) U.S. Cl.
CPC ............ *H04B 7/1555* (2013.01); *H04B 7/10* (2013.01)

(58) Field of Classification Search
CPC . H04B 7/15; H04B 7/155; H01Q 1/50; H01Q 3/02; H01Q 3/30; H01Q 3/32; H01Q 5/44; H01Q 21/00
See application file for complete search history.

(56) References Cited

U.S. PATENT DOCUMENTS

| | | |
|---|---|---|
| 9,295,030 B2 | 3/2016 | Singh et al. |
| 9,792,129 B2 | 10/2017 | Alicot et al. |

(Continued)

FOREIGN PATENT DOCUMENTS

| | | | | |
|---|---|---|---|---|
| CA | 2397430 | * | 1/2001 | ............... H04B 7/15 |
| CN | 101401326 A | * | 4/2009 | ............... H01Q 1/38 |

(Continued)

OTHER PUBLICATIONS

International Search Report dated Mar. 10, 2020 in International Patent Application No. PCT/KR2019/016821.

(Continued)

*Primary Examiner* — Blane J Jackson
(74) *Attorney, Agent, or Firm* — Insight Law Group, PLLC; Seung Lee

(57) ABSTRACT

A transmitting and receiving antenna system of an LPWAN repeater, according to the present invention, comprise: a first antenna and a second antenna that become a transmitting antenna according to a use's setting; a switch coupled to each of the first antenna and the second antenna; a third antenna for reception; an RF receiving end connected to the third antenna for reception; and a control unit for controlling the RF transmitting end and the RF receiving end through switching of the switch, wherein the first antenna is a dipole antenna having multiple directionalities, the second antenna is a directional patch antenna for transmitting signals in one orientational direction, and the third antenna includes an omni-directional antenna.

4 Claims, 5 Drawing Sheets

(51) Int. Cl.
H04B 7/155 (2006.01)
H04B 7/10 (2017.01)

(56) References Cited

U.S. PATENT DOCUMENTS

| | | |
|---|---|---|
| 2007/0117514 A1 | 5/2007 | Gainey et al. |
| 2008/0192670 A1 | 8/2008 | Yen et al. |
| 2012/0001738 A1 | 1/2012 | Hilgers |
| 2016/0269132 A1 | 9/2016 | Clark et al. |

FOREIGN PATENT DOCUMENTS

| | | |
|---|---|---|
| CN | 101401326 A | 4/2009 |
| CN | 107408976 A | 11/2017 |
| KR | 10-2011-0139744 | 12/2011 |
| KR | 10-2014-0107354 | 9/2014 |
| KR | 10-2018-0059385 | 6/2018 |

OTHER PUBLICATIONS

Written Opinion of the International Searching Authority dated Mar. 10, 2020 in International Patent Application No. PCT/KR2019/016821.

* cited by examiner

[FIG. 1]
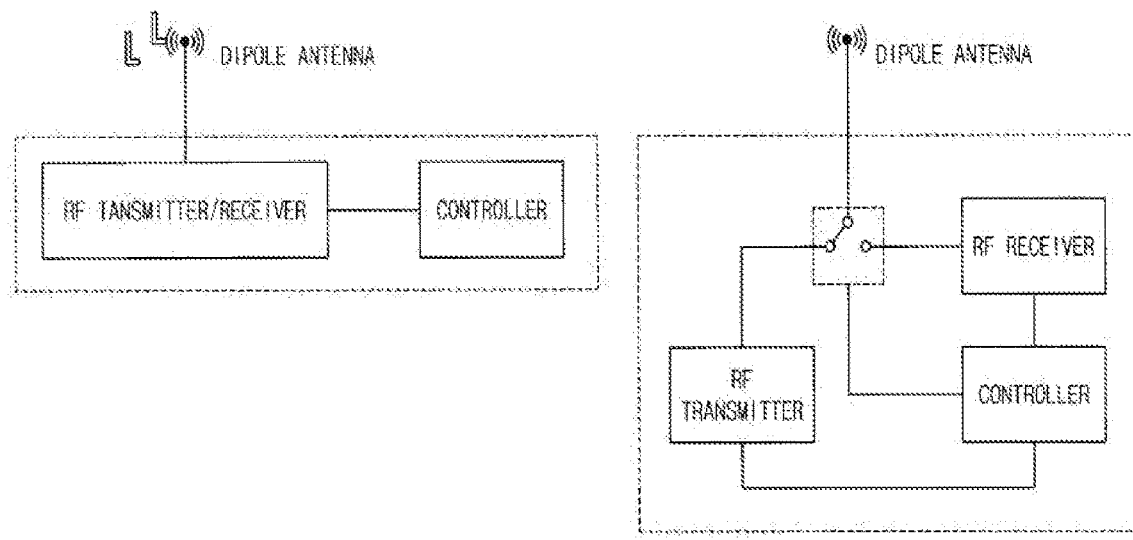

[FIG. 2]
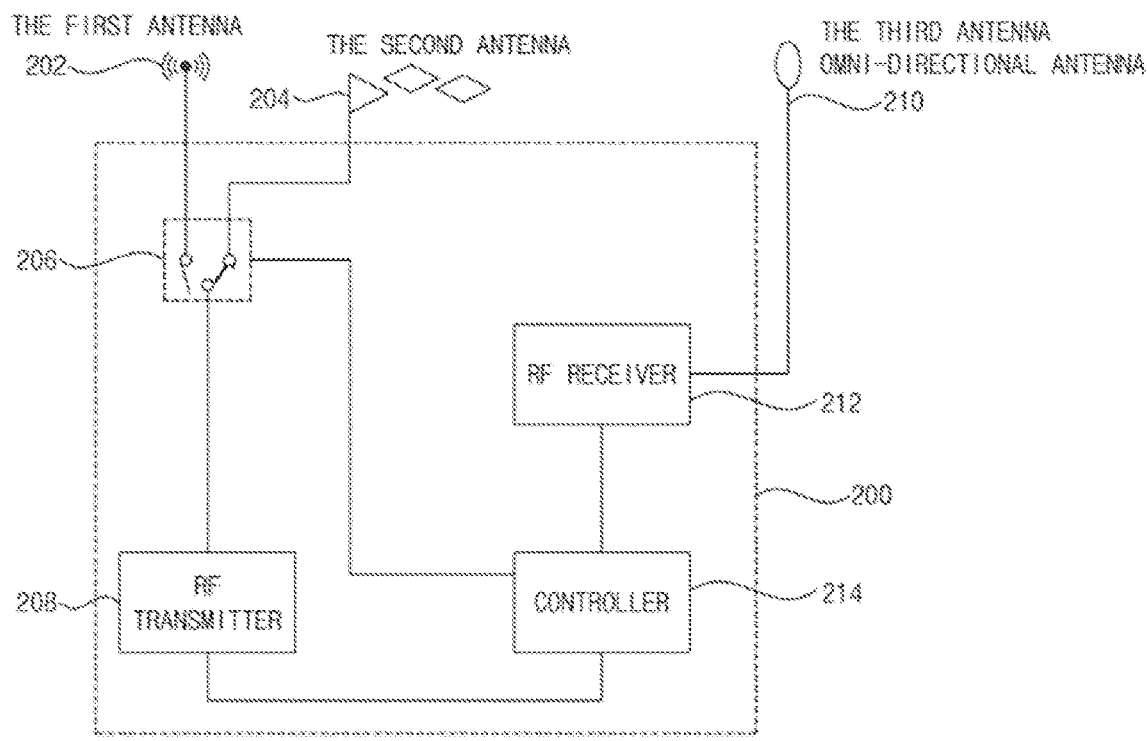

[FIG. 3]
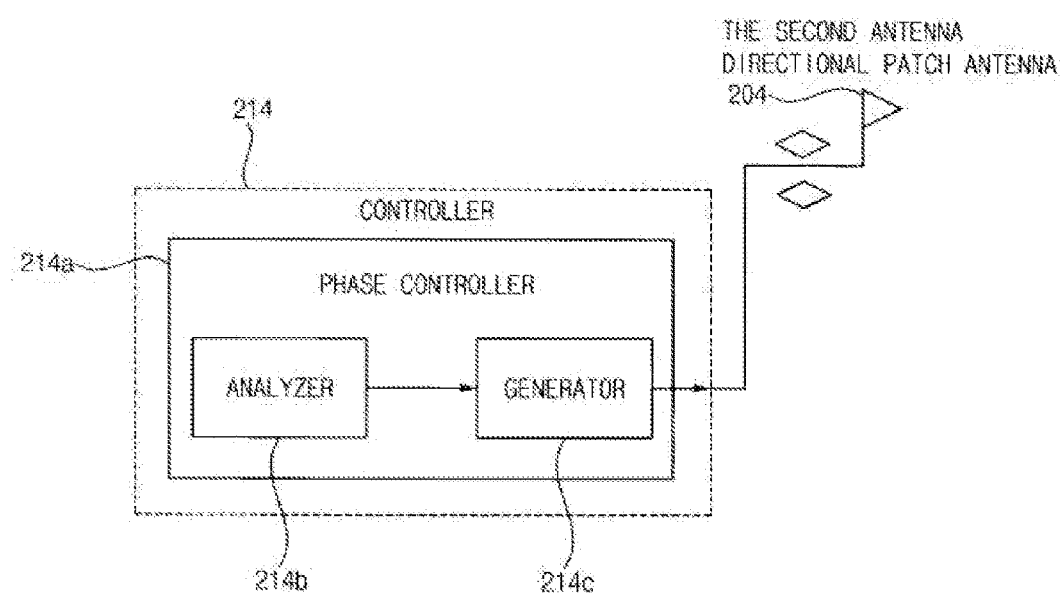

[FIG. 4]
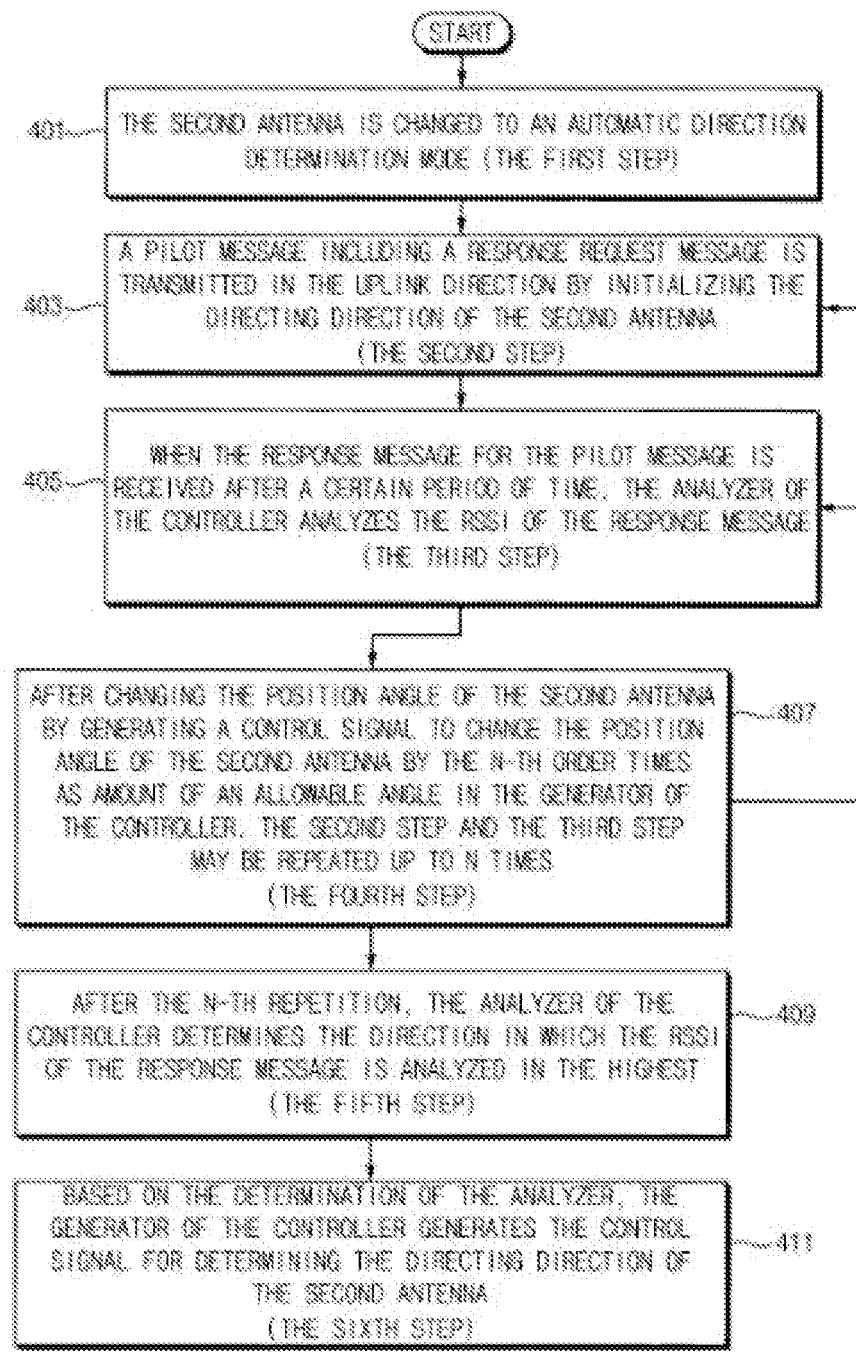

[FIG. 5]
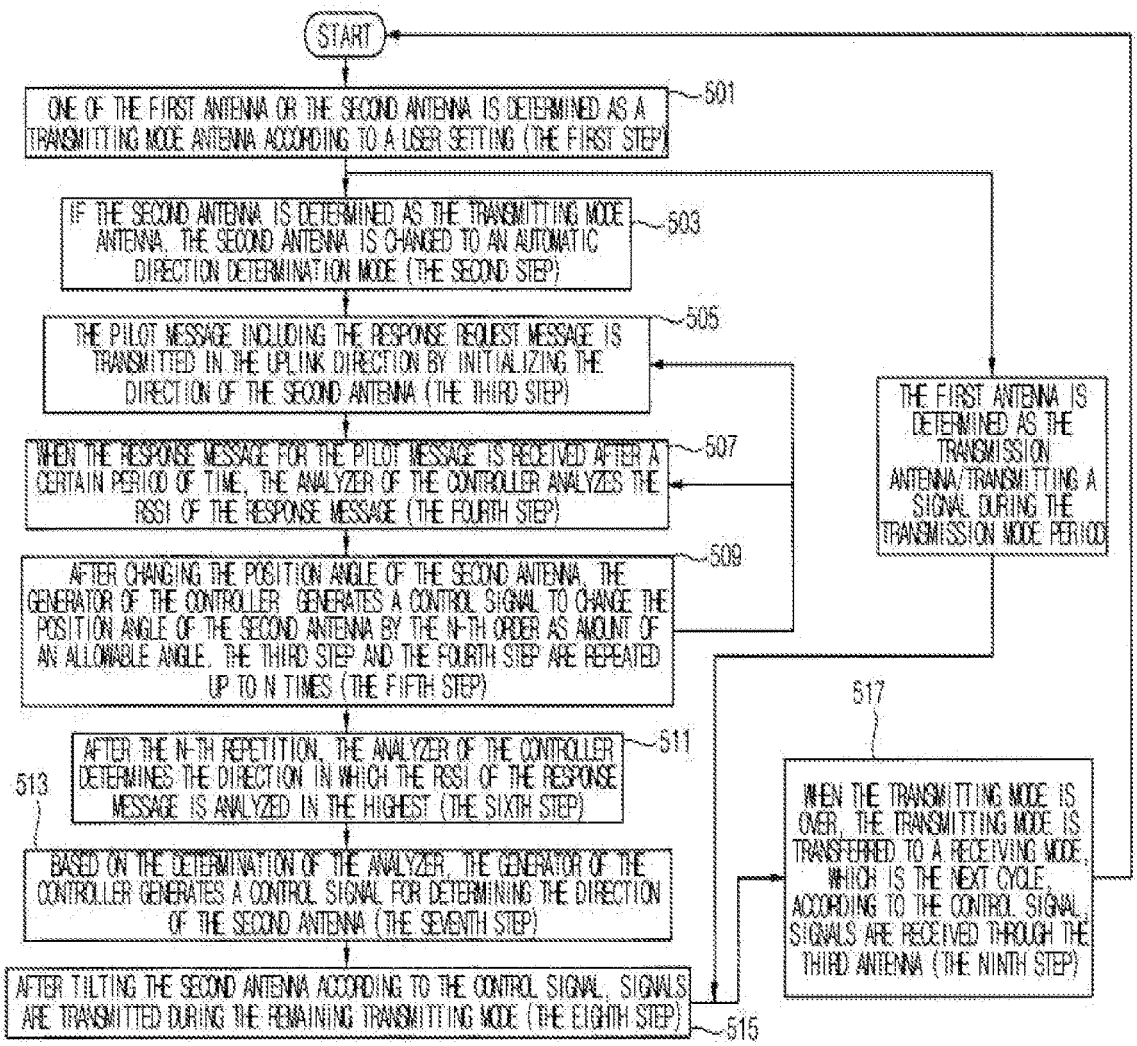

TRANSMITTING AND RECEIVING ANTENNA SYSTEM OF LPWAN REPEATER AND CONTROL METHOD THEREOF

TECHNICAL FIELD

The present disclosure relates to a repeater system for a Low-Power Wide-Area Network (LPWAN) and a control method thereof, and more particularly, to a transmitting and receiving antenna system of the repeater for the LPWAN and the control method thereof.

DISCUSSION OF THE RELATED ART

A repeater may be used to improve a quality of wireless communication between a wireless device and a wireless communication access point, such as a cell tower. The repeater may improve the quality of wireless communication by applying amplification, filtering, and/or other processing techniques to uplink and downlink signals communicated between the wireless device and the wireless communication access point.

The repeater for the Low-Power Wide-Area Network (LPWAN) band, which is a low-power long-distance communication network, has the effect of extending the receiving coverage of the base station by installing it at the critical point of the receiving coverage of the LPWAN band base station.

In addition, by installing the repeater in the receiving coverage, a critical point of the shadow area and a weak field of the receiving coverage of the LPWAN band base station, a service for the shadow area or an uplink message transmission in the weak field of the LPWAN band are possible.

In addition, when the LPWAN band device using a built-in antenna is installed alone and transmits the LPWAN band uplink message, the base station receives the uplink message. In particular, in the case of a device used in the SIGFOX system using the LPWAN band, it cannot be confirmed that the transmitted data has been reliably received by the receiving device because the data is transmitted in the broadcasting method. (SIGFOX: A platform and solution built by SIGFOX company of France using ultra narrow-band modulation technology to build a dedicated network for things with low data usage.)

Therefore, when the repeater is installed in the SIGFOX system, the reception probability in the base station can be further increased because the received uplink message in repeater can be amplified and transmitted to the base station safely.

However, in an environment in which several communication devices are mixed, there is a need for a method for reliable communication of only device using the LPWAN band.

In the currently used repeater for LPWAN band, a dipole antenna is used for transmitting and receiving. In this case, the signal of other nearby devices having greater signal strength in addition to the signal of device that allows the LPWAN band can be received in the repeater for LPWAN band and transmitted to the base station. However, there may be a problem that the repeater system for LPWAN cannot receive the signal from the target device to be received.

SUMMARY

Technical Problem

Accordingly, the technical problem of the present invention was conceived in this respect, and an object of the present invention is to provide a receiver and transmitter antenna configuration of a repeater system for LPWAN in the wireless communication network that can provide higher transmission/reception sensitivity according to the communication environment.

Technical Solution

To solve the above problem and defects, it is an object of the present disclosure to provide an antenna configuration for a receiver and transmitter of a repeater system for LPWAN in a wireless communication network that can provide higher transmit/receive sensitivity according to the communication environment. According to an aspect of the present disclosure, there is provided a transmitting and receiving antenna system of a repeater for a Low-power wide-area network (LPWAN) comprising; a first antenna and a second antenna that selected to an antenna for transmitting according to a user's setting, a switch coupled to each of the first antenna and the second antenna; a third antenna for receiving, a RF transmitter connected to the first antenna and the second antenna through the switch, a RF receiver connected to the third antenna for receiving, and a controller for controlling the RF transmitter and the RF receiver through switching of the switch, wherein the first antenna is a dipole antenna having multiple directivities, the second antenna is a directional patch antenna, and the third antenna is an omni-directional antenna.

In an embodiment of the present disclosure, the controller includes a phase controller for controlling the directivity of the second antenna.

In an embodiment of the present disclosure, the phase controller of the controller includes an analyzer analyzing a Received Signal Strength Indicator (RSSI) of a signal received in response to a pilot message including a response request message, a generator generating a control signal to change a position angle of the second antenna with n-th order as amount of an allowable angle, transmitting the pilot message including the response request message in a uplink direction after changing the position angle of the second antenna, generating a control signal for controlling the directivity of the second antenna based on the information analyzed by the analyzer.

In an embodiment of the present disclosure, the controller includes control steps as a first step for changing to an automatic direction determination mode in the second antenna, a second step for transmitting a pilot message including a response request message in a uplink direction by initializing the directivity of the second antenna, a third step for analyzing a RSSI of the response message in the analyzer when the response message to the pilot message is received after a certain period of time, a fourth step for generating a control signal in a generator of controller, to change a position angle of the second antenna by the n-th order as amount of an allowable angle by repeating the second step and the third step up to n times, a fifth step for determining the direction in which the RSSI of the response message is analyzed in the highest in the analyzer after the n-th repetition, a sixth step for generating a control signal for determining the directivity of the second antenna in the generator based on the determination of the analyzer.

According to an aspect of the present disclosure, in a transmitting and receiving antenna system of repeater for a Low-power wide-area network (LPWAN) including a first antenna and a second antenna that selected to an antenna for transmitting according to a user's setting, a switch coupled to each of the first antenna and the second antenna, a third antenna for receiving, a RF transmitter connected to the first antenna and the second antenna through the switch, a RF receiver connected to the third antenna for receiving; and a controller for controlling the RF transmitter and the RF receiver through switching of the switch, a method of controlling the transmitting and receiving antenna system of the repeater for the Low-power wide-area network (LP-WAN) comprising: a first step for determining one of the first antenna or the second antenna as a transmitting mode antenna according to a user setting, a second step for changing to an automatic direction determination mode of the second antenna, if the second antenna is determined as the transmitting mode antenna, wherein the first antenna transmits signals during a transmitting mode period, if the first antenna is determined as the transmitting mode antenna, a third step for transmitting a pilot message including a response request message in the uplink direction by initializing a directivity of the second antenna, a fourth step for analyzing a RSSI of the response message in the analyzer, when the response message for the pilot message is received after a certain period of time, a fifth step for generating a control signal to change the position angle of the second antenna by the n-th order as amount of an allowable angle by repeating the third step and the fourth step up to n times, a sixth step for determining the direction in which the RSSI of the response message is analyzed in the highest in the analyzer of the controller, after the n-th repetition, a seventh step for generating a control signal for determining the directivity of the second antenna in the generator of the controller based on the determination of the analyzer, an eighth step for transmitting signals during the remaining transmitting mode, after tilting the second antenna according to the control signal; and a ninth step for receiving signals through the third antenna, when the transmitting mode is over, the transmitting mode is transferred to a receiving mode, which is the next cycle, according to the control signal.

In an embodiment of the present disclosure, if the first antenna is determined as the transmitting mode antenna according to the user setting, the first antenna transmits signals during the transmitting mode period.

Advantageous Effects

The present invention has the effect of providing a higher transmission/reception sensitivity according to the communication environment by providing the antenna configuration for the receiver/transmitter of the repeater system for the LPWAN in the wireless communication network.

In addition, in the environment in which several communication devices are mixed, there is an effect that only devices using the LPWAN band can reliably perform communication.

However, the effects of the present invention are not limited to the above effects, and may be variously expanded without departing from the spirit and scope of the present invention.

BRIEF DESCRIPTION OF THE DRAWINGS

FIG. 1 is a diagram showing the structure of a commercial (existing) repeater system for a LPWAN.

FIG. 2 is a diagram showing the structure of a transmitting/receiving antenna system of the repeater for the LPWAN according to an embodiment of the present invention.

FIG. 3 is a diagram illustrating a functional block diagram of a control unit in the transmitting/receiving antenna system of the repeater for the LPWAN according to an embodiment of the present invention.

FIG. 4 is a flowchart illustrating a process for determining a directivity of a second antenna in the transmitting/receiving antenna system of the repeater for the LPWAN according to an embodiment of the present invention.

FIG. 5 is a flowchart illustrating an operation process of the transmitting/receiving antenna system of the repeater for the LPWAN according to an embodiment of the present invention.

DETAILED DESCRIPTION OF THE EMBODIMENTS

Hereinafter, exemplary embodiments of the present disclosure will be described in detail to with reference to the accompanying drawings, which will be readily apparent to those skilled in the art to which the present disclosure pertains.

The present disclosure may be embodied in many different forms and is not limited to the embodiments described herein. In the drawings, parts not relating to the description are omitted for clarifying the present disclosure, and the same reference numerals are assigned to the same or similar components throughout the specification.

FIG. 1 shows the structure of a commercial(existing) repeater system for LPWAN. Referring to the drawings, as one dipole antenna, the role of the transmitting or receiving antenna is alternately performed. That is, while the receiver of the repeater system may receive down data, the transmitter of the repeater system may not transmit uplink data.

In addition, while a received data from the receiver of the repeater system is transmitted through the transmitter of the repeater system to the base station, the receiver of the repeater system may not receive other data. Due to this unidirectional transmission/reception characteristic, the repeater system for the LPWAN may be implemented in a low cost and a small size.

This invention may intend to suggest a method for improving a performance and a high data transmission success rate while maintaining the characteristics of the repeater system for the LPWAN.

FIG. 2 is a diagram showing the structure of the transmitting/receiving antenna system 200 of the repeater for LPWAN proposed in the present invention.

The repeater system 200 may comprise a first antenna 202 and a second antenna 204 for transmitting, a switch 206 coupled to the first antenna 202 and the second antenna 204, respectively, a RF transmitter 208 connected to the first antenna 202 and the second antenna 204 through the switch 206, a third antenna for receiving 210, a RF receiver 212 connected to the third antenna for receiving 210 and a controller 214 that controls the switch 206, the RF transmitter 208 and the RF receiver 212.

The controller 214 may control to transmit a first signal and a second signal through a first transmitting path or a second transmitting path, which are connected to the RF transmitter 208 through the switch 206 coupled to the first antenna 202 and the second antenna 204 for transmitting, respectively. The controller 214 may include a control circuit for controlling to receive a signal through the third antenna 210.

The first antenna 202 may be a dipole antenna having multiple directivities, the second antenna 204 may be a directional patch antenna that transmits a signal in one direction of the antenna, and the third antenna 210 may be an omni-directional antenna.

The first antenna 202 and the second antenna 204 for transmitting may be selected as the transmitting antenna according to the use environment by applying the switch 206. In particular, in case of transmitting only in a shaded area or a specific area, the second antenna 204, which is the directional patch antenna, may be selected as the transmitting antenna, to transmit a signal with a higher S/N.

The third antenna 210 may be the omni-directional antenna capable of receiving signals from devices existing in the shaded area or the weak electric field. In addition, the third antenna 210 may extend the receiving distance through an extension cable and receive signals from the shaded area inside a building.

As described above, the repeater system 200 of the present invention is configured to utilize the characteristics of each antenna well, so the transmitting/receiving efficiency can be maximized.

FIG. 3 may be a diagram illustrating a functional block diagram of the controller 214 in the repeater system 200.

Referring to FIG. 3, the controller 214 may include a phase controller 214a that controls the directivity of the second antenna 204.

The phase controller 214a may include an analyzer 214b for analyzing the direction in which a signal from the device allowed in the LPWAN band and a generator 214c that generates an antenna control signal for controlling the directivity of the second antenna 204.

The analyzer 214b may serve to determine the direction of the signal coming from the device allowed in the LPWAN band or whether there is the shadow area. The analyzer 214b may determine the antenna directivity as the direction of the signal coming from the device.

That is, the analyzer 214b of the phase controller 214a may serve to analyze a Received Signal Strength indicator (RSSI) of the signal received in response to a pilot message including a response request message.

The generator 214c of the phase controller 214a may generate a control signal to change the position angle of the second antenna with n-th order as amount of an allowable angle. After changing the position angle of the second antenna, the generator 214c of the phase controller may transmit the pilot message including the response request message in the uplink direction. The generator 214c of the phase controller may generate a control signal for controlling the directivity of the second antenna based on the information analyzed by the analyzer 214b.

FIG. 4 is a flowchart for determining the direction of the second antenna 204 in the controller 214 of FIG. 3.

The second antenna 204 may be changed to an automatic direction determination mode (The first step, 401). A pilot message including a response request message may be transmitted in the uplink direction by initializing the directivity of the second antenna 204 (The second step, 403)

When the response message for the pilot message is received after a certain period of time, the analyzer 214b of the controller may analyze the RSSI of the response message (The third step, 405).

After changing the position angle of the second antenna 204, the generator 214c of the controller may generate a control signal to change the position angle of the second antenna 204 by the n-th order as amount of an allowable angle by repeating the second step and the third step up to n times (The fourth step, 407)

After the n-th repetition, the analyzer 214b of the controller 214 may determine the direction in which the RSSI of the response message is analyzed in the highest (The fifth step, 409)

Based on the determination of the analyzer 214b, the generator 214c of the controller 214 may generate a control signal for determining the directivity of the second antenna 204 (The sixth step, 411).

After tilting the second antenna 204 according to the control signal, other signals are transmitted during the remaining transmission mode.

FIG. 5 is a flowchart illustrating an operation process of the repeater system 200 for LPWAN of FIG. 2 according to an embodiment of the present invention.

According to the embodiment of the present invention, the repeater system 200 may comprise a first antenna 202 and a second antenna 204 for transmitting, a switch 206 coupled to the first antenna 202 and the second antenna 204, respectively, a RF transmitter 208 connected to the first antenna 202 and the second antenna 204 through the switch 206, a third antenna for receiving 210, a RF receiver 212 connected to the third antenna for receiving 210 and a controller 214 that controls the switch 206, the RF transmitter 208 and the RF receiver 212.

First, one of the first antenna or the second antenna may be determined as a transmitting mode antenna according to a user setting (The first step, 501). If the second antenna may be determined as the transmitting mode antenna, the second antenna 204 may be changed to an automatic direction determination mode (The second step, S503).

If the first antenna is determined as the transmitting mode antenna according to the user setting, it may transmit a signal during a transmitting mode period.

The pilot message including the response request message may be transmitted in the uplink direction by initializing the directivity of the second antenna (The third step, 505)

When the response message to the pilot message is received after a certain period of time, the analyzer 214b of the controller may analyze the RSSI of the response message (The fourth step, 507).

After changing the position angle of the second antenna 204, the generator 214c of the controller may generate a control signal to change the position angle of the second antenna 204 by the n-th order as amount of an allowable angle by repeating the third step and the fourth step up to n times (The fifth step, 509) After the n-th repetition, the analyzer 214b of the controller 214 may determine the direction in which the RSSI of the response message is analyzed in the highest (The sixth step, 511)

Based on the determination of the analyzer 214b, the generator 214c of the controller 214 may generate a control signal for determining the directivity of the second antenna 204 (The seventh step, 513).

Based on the determination of the analyzer, the generator of controller may generate a control signal for determining the directivity of the second antenna (the eighth step, 515) After tilting the second antenna 204 according to the control signal, signals may be transmitted during the remaining transmitting mode (The ninth step, 517).

When the transmitting mode is over, the transmitting mode is transferred to a receiving mode, which is a next cycle, according to the control signal, signals may be received through the third antenna (The tenth step-, 519)

The repeater system 200 can increase the receiving efficiency of the signal from the device allowed in the LPWAN in the environment in which several communication devices are mixed through this process.

The control unit 214 of the repeater system 200 may select an antenna with good transmission efficiency among the first antenna 202 and the second antenna 204 through the switching 206 based on the strength of signal sent as the pilot signal. This makes it possible to efficiently transmit signals received from the device allowed in the LPWAN to the base station.

Therefore, it can be said that the repeater system capable of increasing transmission efficiency while increasing reception strength compared to the prior art is constructed.

As described above, the present disclosure has been described with respect to particularly preferred embodiments. However, the present disclosure is not limited to the above embodiments, and it is possible for one who has an ordinary skill in the art to make various modifications and variations, without departing off the spirit of the present disclosure.

DESCRIPTION OF INDEX

200: REPEATER
202: THE FIRST ANTENNA
204: THE SECOND ANTENNA
206: SWITCH
208: RF TRANSMITTER
210: THE THIRD ANTENNA
212: RF RECEIVER
214: CONTROLLER

What is claimed is:

1. A transmitting and receiving antenna system of a repeater for a Low-power wide-area network (LPWAN) comprising;
   a first antenna and a second antenna that selected to an antenna for transmitting according to a user's setting;
   a switch coupled to each of the first antenna and the second antenna;
   a third antenna for receiving;
      a RF transmitter connected to the first antenna and the second antenna through the switch;
      a RF receiver connected to the third antenna for receiving; and
      a controller for controlling the RF transmitter and the RF receiver through switching of the switch,
      wherein the first antenna is a dipole antenna having multiple directivities, the second antenna is a directional patch antenna, and the third antenna is an omni-directional antenna,
      wherein the controller includes a phase controller for controlling the direction of the second antenna, and
      wherein the phase controller of the controller includes an analyzer analyzing a Received Signal Strength Indicator (RSSI) of the signal received in response to a pilot message including a response request message, a generator generating a control signal to change the position angle of the second antenna with n-th order as amount of an allowable angle, transmitting the pilot message including the response request message in a uplink direction after changing a position angle of the second antenna, generating a control signal for controlling the directivity of the second antenna based on the information analyzed by the analyzer.

2. The transmitting and receiving antenna system of the repeater for the LPWAN of claim 1, wherein the controller includes control steps as a first step for changing to an automatic direction determination mode in the second antenna, a second step for transmitting a pilot message including a response request message in a uplink direction by initializing the directivity of the second antenna, a third step for analyzing a RSSI of the response message in the analyzer when the response message to the pilot message is received after a certain period of time, a fourth step for generating a control signal in a generator of controller, to change the position angle of the second antenna by the n-th order as amount of an allowable angle by repeating the second step and the third step up to n times, a fifth step for determining the direction in which the RSSI of the response message is analyzed in the highest in the analyzer after the n-th repetition, a sixth step for generating a control signal for determining the directivity of the second antenna in the generator based on the determination of the analyzer.

3. In a transmitting and receiving antenna system of repeater for a Low-power wide-area network (LPWAN) including a first antenna and a second antenna that selected to an antenna for transmitting according to a user's setting, a switch coupled to each of the first antenna and the second antenna, a third antenna for receiving, a RF transmitter connected to the first antenna and the second antenna through the switch, a RF receiver connected to the third antenna for receiving; and a controller for controlling the RF transmitter and the RF receiver through switching of the switch, a method of controlling the transmitting and receiving antenna system of the repeater for the Low-power wide-area network (LPWAN) comprising:
   a first step for determining one of the first antenna or the second antenna as a transmitting mode antenna according to a user setting;
   a second step for changing to an automatic direction determination mode of the second antenna, if the second antenna is determined as the transmitting mode antenna,
   wherein the first antenna transmits signals during a transmitting mode period, if the first antenna is determined as the transmitting mode antenna;
   a third step for transmitting a pilot message including a response request message in the uplink direction by initializing the directivity of the second antenna;
   a fourth step for analyzing a RSSI of the response message in the analyzer, when the response message for the pilot message is received after a certain period of time;
   a fifth step for generating a control signal to change the position angle of the second antenna by the n-th order as amount of an allowable angle by repeating the third step and the fourth step up to n times;
   a sixth step for determining the direction in which the RSSI of the response message is analyzed in the highest in the analyzer of the controller, after the n-th repetition;
   a seventh step for generating a control signal for determining the directivity of the second antenna in the generator of the controller based on the determination of the analyzer;
   an eighth step for transmitting signals during the remaining transmitting mode, after tilting the second antenna according to the control signal; and
   a ninth step for receiving signals through the third antenna, when the transmitting mode is over, the transmitting mode is transferred to a receiving mode, which is the next cycle, according to the control signal.

4. The method of controlling the transmitting and receiving antenna system of the repeater for the LPWAN of claim 3, if the first antenna is determined as the transmitting mode antenna according to the user setting, the first antenna transmits signals during the transmitting mode period.

\* \* \* \* \*